(No Model.)
E. M. MILES.
ELECTRIC BELT.
No. 521,594. Patented June 19, 1894.
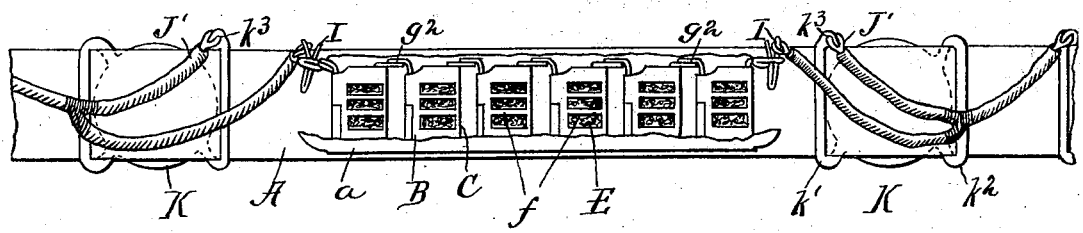
Fig 1.
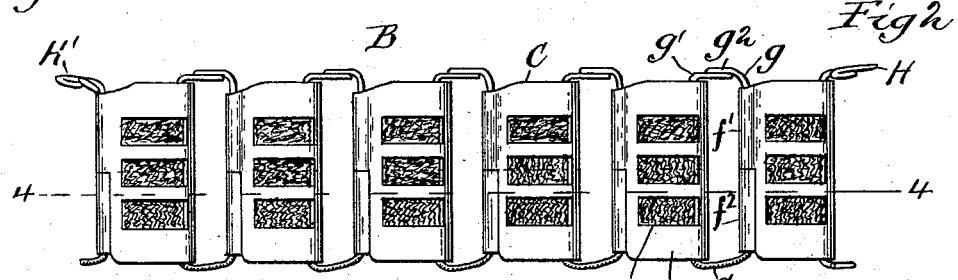
Fig 2.
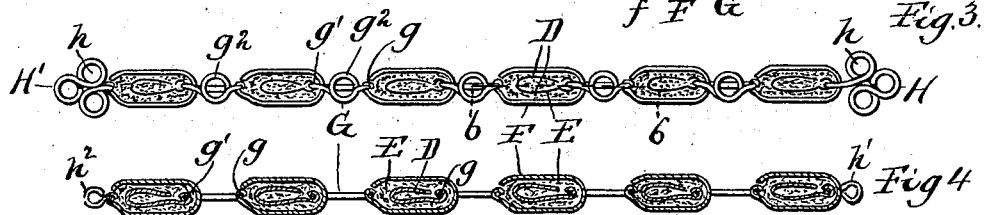
Fig 3.
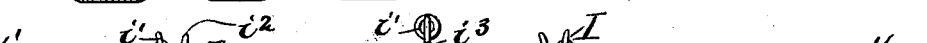
Fig 4.
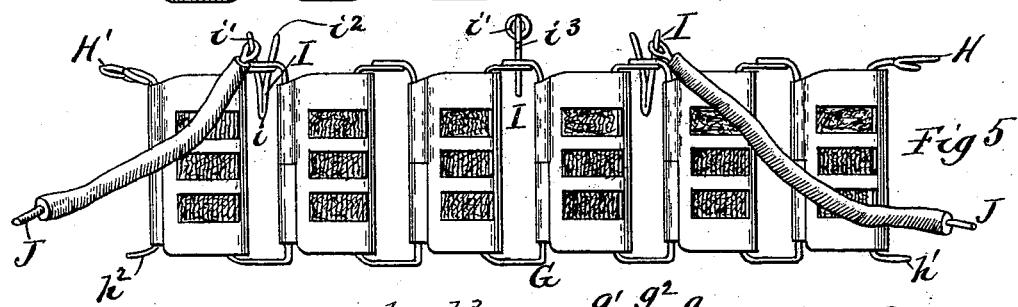
Fig 5.
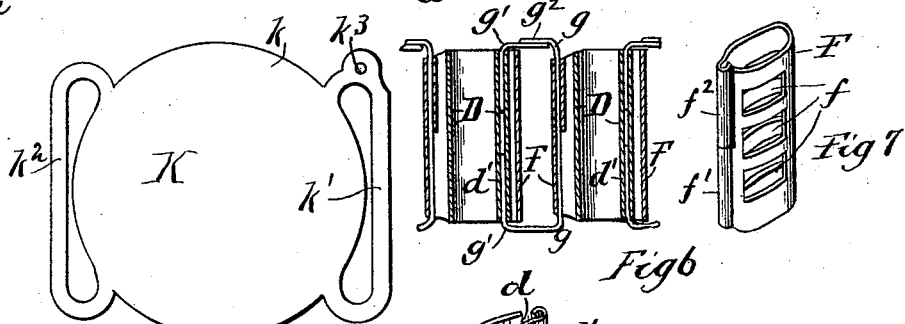
Fig 9.   Fig 6.   Fig 7.
Fig 8.
Witnesses
W. C. Cates
Jno. A. Christianson.
Inventor
Erastus M. Miles
By Robt. Thacher
Attys
THE NATIONAL LITHOGRAPHING COMPANY,
WASHINGTON, D. C.

UNITED STATES PATENT OFFICE.

ERASTUS M. MILES, OF CHICAGO, ILLINOIS.

ELECTRIC BELT.

SPECIFICATION forming part of Letters Patent No. 521,594, dated June 19, 1894.

Application filed July 1, 1893. Serial No. 479,364. (No model.)

*To all whom it may concern:*

Be it known that I, ERASTUS M. MILES, a citizen of the United States, residing at Chicago, in the county of Cook and State of Illinois, have invented certain new and useful Improvements in Electric Belts, which are fully set forth in the following specification, reference being had to the accompanying drawings, in which—

Figure 1 represents an elevation of a portion of an electric belt embodying my improvement, the battery pocket being partly broken away; Fig. 2, a similar elevation of the battery detached; Fig. 3, a plan view of the battery; Fig. 4, a plan section of the same taken on the line 4. 4 of Fig. 2; Fig. 5, an elevation of the battery detached, with the switches or cut-outs and electrode-conductors applied thereto; Fig. 6, a detail vertical section taken on the line 6. 6 of Fig. 3; Fig. 7, a perspective view of the copper exterior plate or casing of a cell detached; Fig. 8, a similar view of the interior zinc plate of a cell detached; and Fig. 9, an elevation of my improved electrode detached. Fig. 1 is upon a scale by itself; all the remaining figures are upon one and the same scale, but enlarged from that of Fig. 1.

My invention relates to that class of devices now generally known as "electric belts," in which an electric battery is applied to and carried by a belt adapted to be applied to the person, and provided with suitable devices and connections for the purpose of transmitting continuous current to different parts of the person.

The invention consists in certain improvements in the construction of the battery cells, the connections thereof, and certain other special features of the general device.

I will now describe in detail the construction and operation of the battery and its connections, and such other parts as may be necessary for an understanding of my invention, and will then designate in claims the particular improvements which I believe to be new and wish to secure by Letters Patent.

In the drawings, A represents a belt of any ordinary construction adapted to carry the battery, and other appliances usually attached to electric belts; it is provided with a pocket, $a$, for the reception of the battery, B, this being a well known device for carrying the battery on the belt. The battery is made of a series of cells, C, and as one feature of my invention relates to the particular construction of these cells, I will describe this construction in detail. Usually the cells heretofore used in these batteries have been constructed with zinc as the outer and copper as the inner metal; but, as well known, zinc corrodes much more rapidly than copper, and if the cells are made with the zinc upon the outside, it will be used up much more rapidly than the copper, and will require replacement long before the inner copper plates. To avoid this objection, I make the outer plate of copper and the inner one of zinc, and, at the same time, give such form to the latter as will provide a sufficiently large surface for exposure to the acid to obtain the result desired.

In Fig. 8 of the drawings, the inner or zinc element is represented separately. It is formed from a thin zinc plate bent around in a curve upon itself so as to form an almost closed tube, D. The bend is of such a nature that there will be a sufficient space between the two sides to accommodate a portion of the absorbent and the edges of the plate are not closed down, but a free space, $d$, is left between them. One of the edges is also bent to form a link socket, $d'$. A strip, E, of any suitable absorbent material is inserted through the space between the edges of this zinc element, D, and pressed into the space between the two sides thereof so as to completely fill the same, and is then wound around upon the outside of this zinc element so as to completely inclose it, as seen in Figs. 3 and 4. The outer element, F, is formed from a copper plate, which is bent around the outside of the absorbent, E, so as to completely inclose the latter together with the inner element wrapped therein. When thus wrapped around the absorbent strip, this outside element, F, also forms a kind of tube, as seen in Fig. 7, which constitutes the shell or case of the cell. Preferably it is provided with a series of slots, $f$, cut in each side thereof, and one-half of each edge is turned so as to form a hinge connection, $f'$ and $f^2$, which, together, make not only a socket or receptacle for the hinge, but also a means for securing the edges of this outer shell together when the hinge rod is put in place. The hinges, G, are made of a single piece of copper wire bent in the form shown in Fig. 6, from which it will appear that the hinge as completed is of rectangular form, one side, $g$, being entire, while the other is divided, being made up from the two ends, $g'$, of the wire, as seen in said figure. There is also a small coil, loop, or eye, $g^2$, in the wire at such a point that it will appear at one end of the completed hinge, as seen in Figs. 2, 3, 5 and 6. At each end of the battery there is a single hinge or pivot rod which is substantially one-half of the regular hinge. This rod, H, at one end of the battery is mounted in the inside or zinc element of the cell, as seen in Figs. 3 and 4. At its upper end it is coiled so as to provide three loops or eyes, $h$, similar to the loops, $g^2$. The lower end is shaped in some suitable way to hold the rod in place; in the drawings this end is shown turned to make a single coil, $h'$, which prevents the rod from being pulled through its bearings. The similar rod, H', at the other end is mounted in the hinge bearings of the outer shell or copper element of the cell at that end of the battery, as seen in said Figs. 3, 4 and 5, and is provided with loops or eyes, $h-h'$, like those on the rod at the opposite end of the battery.

The loops or eyes in the hinge connections are provided for the application of the cut-out or switch by means of which cells may be cut out from the working portion of the battery, as may be required. This switch or cut-out, I, is of special construction to adapt it to be inserted in the eyes. It is made from a single small piece of elastic metal, bent over upon itself but not closed down at the extremities, the latter being left to spring apart, as seen in Fig. 5. There is, therefore, formed a rather blunt point, $i$, at the doubled end of this piece, and at the extremities of the two branches there is provided on one an eye, $i'$, while the other one, $i^2$, is left free. These cut-outs or switches are, therefore, adapted to be set into any one of the said eyes or loops, and when set down into position they are held in place by a little notch, $i^3$, in one or both the arms, and the elasticity of the said arms, which are pressed together more or less by the insertion in the eye. The conductors, J, of the electrodes have these switches or cut-outs linked to their extremities, as seen in Figs. 1 and 5, so that connection may be made with the battery either at the ends thereof by insertion in one of the eyes, $h$, or in any one of the eyes, $g^2$, standing between adjacent cells of the battery, so that obviously either the entire battery may be used or any desired portion thereof.

The electrodes, K, are, of course, intended to be used as usual in electric belts; but I have also devised a new construction of electrode. This device is a single piece of sheet metal, consisting of a disk, $k$, provided with loops, $k'$ and $k^2$, arranged on opposite sides of the disk, but made in one piece with the latter by cutting out the metal in proper shape, when the round disk itself is cut out and stamped up. These loops are offset a little from the disk so that the belt may be run through them at the back of the disk, as seen in Fig. 1, and in this way the electrodes are secured to the belt, and, at the same time, they may be slid along the latter for ready adjustment, as may be desired. One of the loops, $k'$, is provided at one end with an aperture, $k^3$, to which the electric conductor, J, is linked or a branch thereof if two or more electrodes are employed in connection with one pole of the battery. In Fig. 1 of the drawings two electrodes are shown, and the main conductor, J, has a branch, J', which is linked to the first electrode from the battery, while the main conductor is extended and linked directly to the second electrode.

The switches or cut-outs provide convenient means for connecting the flexible conductors to the battery at any point, for, obviously, they may be set into eyes, $h$, at the ends of the battery, as seen in Fig. 1, or one or both may be set in intermediate eyes, $g^2$, anywhere along the battery, as seen in Fig. 5, according to the number of cells it is desired to use.

It will be understood, of course, that in preparation for use the battery is charged with any suitable acid solution, which is taken up and held by the absorbent filling in the cells. The cells are made durable by my arrangement of the copper element on the outside, while the zinc element is on the inside protected from the atmosphere; but, at the same time, I obtain a large surface of zinc for the action of the acid by constructing this element in the way described, whereby a space for the absorbent is left between the two parts or leaves folded partially upon each other, so that the absorbent fills this space as well as the space between the two elements. The entire surface of the zinc plate on both sides thereof is, therefore, exposed to the action of the acid, and, therefore, utilizes this inside element to the fullest possible extent for battery purposes. It will also be seen that the link is connected to both cells to which it is applied by a hinge joint, thereby making a battery extremely flexible so that it readily adjusts itself to the person. The construction of the hinge rods at each end of the battery with three eyes or loops, as described, provides not only for the attachment of the conductors, but also for other devices applied to the person, as often used in connection with these belts; it will be noticed that these eyes are arranged in a horizontal plane, as seen in Fig. 3. These eye receptacles in connection with the switches or cut-outs described, for which they provide a kind of socket, make a very reliable means for connecting the conductors to the battery, for it is obvious that they are not easily displaced and will remain in a substantially permanent position when once adjusted. The improved electrode being in one piece, cut and stamped at once from the metal, it is exceedingly cheap and simple to make. At the same time it provides means for securing to the belt without danger of detachment and without danger of disconnection from the battery, which sometimes occurs where the electrode is made in two or more pieces.

Having thus described my invention, what I believe to be new, and desire to secure by Letters Patent, is—

1. In a battery for electric belts, a cell composed of an outer shell or case, F, of copper, in combination with an inner plate, D, of zinc bent upon itself but with a space between the two sides opening out between the two free edges, and an absorbent strip, E, arranged within the said space and surrounding the said inside element, D, in the space between the latter and the outside element or shell, substantially as described.

2. In a battery for electric belts, the cells, in combination with a hinge device connecting adjacent cells and provided with an eye or loop formed in the hinge itself for making connections, substantially as described.

3. In a battery for electric belts, the cells, C, in combination with the wire hinges, G, connected to opposite elements of adjacent cells, and provided with a loop or eye, $g^2$, formed by bending the wire into a loop at one end of each hinge, substantially as described.

4. In a battery for electric belts, a switch or cut-out, I, consisting of a single strip or wire bent upon itself, and with the ends diverging, substantially as described.

5. In a battery for electric belts, the cells, C, in combination with a hinge connecting adjacent cells and provided with an eye or loop, $g^2$, the switch or cut-out, I, constructed as specified, and the electrode conductors, substantially as described.

6. In electric belts, an electrode consisting of a disk, $k$, provided with loops, $k'$, $k^2$, in one piece with said disk, substantially as described.

7. In an electric belt, the battery cells, in combination with hinge connections between the cells, provided with eyes or loops, $g^2$, the cut-outs, I, constructed as specified, the electrodes, K, consisting of a disk, $k$, provided with loops, $k'$, $k^2$, in one piece therewith, the conductors, J, and the belt, A, substantially as described.

ERASTUS M. MILES.

Witnesses:
R. C. PAGE,
W. C. CORLIES.